United States Patent
Veneziano et al.

(10) Patent No.: US 7,766,132 B2
(45) Date of Patent: Aug. 3, 2010

(54) DISC BRAKE CALIPER

(75) Inventors: Aristide Veneziano, Bergamo (IT); Alberto Previtali, Bergamo (IT)

(73) Assignee: Freni Brembo S.p.A., Curno (Bergamo) (IT)

( * ) Notice: Subject to any disclaimer, the term of this patent is extended or adjusted under 35 U.S.C. 154(b) by 366 days.

(21) Appl. No.: 11/871,677

(22) Filed: Oct. 12, 2007

(65) Prior Publication Data
US 2008/0185243 A1   Aug. 7, 2008

(30) Foreign Application Priority Data
Oct. 13, 2006  (IT)  .......................... MI2006A1973

(51) Int. Cl.
*F16D 65/092* (2006.01)

(52) U.S. Cl. .................................. 188/73.39

(58) Field of Classification Search ............... 188/71.1, 188/73.39, 73.46, 73.47, 368–370
See application file for complete search history.

(56) References Cited

U.S. PATENT DOCUMENTS

| | | | | |
|---|---|---|---|---|
| 4,530,423 A | * | 7/1985 | Ritsema | 188/73.39 |
| 4,540,068 A | | 9/1985 | Ritsema | |
| 4,570,760 A | * | 2/1986 | Schmidt | 188/73.44 |
| 4,632,227 A | * | 12/1986 | Mery et al. | 188/73.32 |
| 5,181,588 A | * | 1/1993 | Emmons | 188/73.31 |
| 5,343,985 A | * | 9/1994 | Thiel et al. | 188/72.5 |
| 5,394,963 A | * | 3/1995 | Deane et al. | 188/73.31 |
| 5,445,242 A | * | 8/1995 | Pogorzelski et al. | 188/71.6 |
| 5,558,183 A | * | 9/1996 | Way | 188/71.6 |
| 6,223,867 B1 | * | 5/2001 | Doi et al. | 188/73.45 |
| 6,247,561 B1 | * | 6/2001 | Doi et al. | 188/73.39 |
| 6,648,104 B1 | * | 11/2003 | Buckley et al. | 188/71.6 |
| 6,708,802 B2 | * | 3/2004 | Stahl et al. | 188/71.1 |
| 7,461,725 B2 | * | 12/2008 | Kloos et al. | 188/73.1 |

FOREIGN PATENT DOCUMENTS

| | | |
|---|---|---|
| EP | 1167804 | 1/2002 |
| EP | 1396652 | 3/2004 |
| EP | 1548316 | 6/2005 |

* cited by examiner

*Primary Examiner*—Christopher P Schwartz
(74) *Attorney, Agent, or Firm*—Shoemaker and Mattare

(57) ABSTRACT

A disc brake caliper (4) comprising a first half caliper on the support side and a second half caliper on the wheel side (20, 24), at least one of said portions comprising a seat (28) having a prevailing extension that defines an axial direction (X-X). The caliper comprises at least one inclined bridge element (40) suitable for structurally connecting said first and said second half caliper (20, 24), said at least one bridge element (40) defining a substantial longitudinal prevailing extension direction (S-S) inclined by a predetermined angle (A) relative to the axial direction (X-X).

23 Claims, 7 Drawing Sheets

DISC BRAKE CALIPER

CROSS-REFERENCE TO RELATED APPLICATIONS

This application claims benefit of priority from Italian Application Serial No. MI2006A001973, filed Oct. 13, 2006.

TECHNICAL FIELD

This document relates to a disc brake caliper, and in particular a disc brake caliper suitable for being used on high performance vehicles.

BACKGROUND

Disc brake calipers are arranged astride of a brake disc and are fixed on the inner side of a vehicle so as to be projecting on the outer side of the vehicle facing the associable wheel. On both sides of the caliper body there are arranged pads that act on braking surfaces of the brake disc, perpendicular to the axis of rotation of the brake disc. The axis of rotation of the brake disc and of the wheel defines an axial direction. Pads are pushed by pistons, seated in special seats, in abutment against the braking surfaces. The caliper body exhibits a seating window for the pads and for the disc portion influenced by the pads, the window allowing aeration for disposing of the heat generated by the braking.

Disc brake calipers in high performance vehicles are subject to considerable stress, both thermal and mechanical. The deformations of the caliper body in the braking step essentially are due to axial forces exchanged with the pushing pistons of the pads and to tangential forces exchanged between the pads and the braking band of the brake disc. The axial forces tend to open the caliper body making it take a "barrel" configuration, while the tangential forces tend to deform the caliper body as a "parallelogram," a phenomenon known as "twisting" of the caliper body. The axial opening of the caliper body tends to decrease the braking sensitivity, the actuating stroke of the brake control being equal. The is twisting essentially due to the forces transmitted by the pads of the external half caliper due to the arm provided between the reaction point of the braking torque and the caliper body supports. The deformations of the caliper body, and in particular those of "twisting," negatively affect the roll-back, that is, the moving back of the pad pushing pistons at the end of the braking step, causing sticking of the pads and relevant abnormal wear.

In order to oppose the deformations of the caliper body, it is possible to use a central bridge that extends astride of the brake disc and perpendicular thereto so as to connect the two half calipers to each other, respectively on the connection side and on the wheel side. Central bridges having large thicknesses, especially in tangential direction, are used in calipers for high performance vehicles. Solutions of central bridges that completely cover the window of seating space of the pads, provided with openings for heat venting, also are known. Such solutions imply the use of very cumbersome and heavy central bridges that excessively increase the mass of the caliper body and limit heat disposal.

The large mass of the caliper body and the poor heat disposal considerably disadvantage the high performance vehicles that require particularly small non-suspended masses, for improving the dynamic behavior of the vehicle, and a high heat disposal capacity of the caliper body to prevent hazardous "fading" phenomena. The "fading" essentially consists in a decrease of the braking effect, the brake control stroke being equal, and in extreme cases it can even lead to the inefficiency of the braking system.

In order to solve this problem, a central bridge constrained at the half caliper on the support side and free at the half caliper on the external side, also has been used. In this solution, the central bridge receives the tangential forces from the pads and relieves them on the caliper supports so as to prevent relieving the tangential forces on the half caliper on the external side. This solution, however, does not prevent the "twisting" deformations of the caliper body when the central bridge under the load gets deformed, abutting against the external half caliper. Moreover, the deformation of the central bridge causes a certain delay in the braking response which for a racing vehicle is unacceptable. Moreover, since such a bridge is free at a half caliper, it offers no resistance to the axial deformations of the caliper body.

SUMMARY

This document is based on the development of a disc brake caliper that solves disadvantages such as those mentioned above. The caliper can have an innovative geometry comprising a bridge element that has a longitudinal prevailing extension that is inclined by an angle relative to an axial direction of the caliper body. The bridge element has a high resistance both to axial deformation and to "twisting" deformation.

This document features a disc brake caliper, comprising a caliper body suitable for being fixed to a fixed support structure of a motor vehicle and suitable for being arranged astride of a disc for disc brake, the disc comprising a braking surface on the support side and a braking surface on the wheel side, opposite the braking surface on the support side and facing an associable wheel of the vehicle, the caliper body comprising a first half caliper on the support side suitable for facing the braking surface on the disc support side and a second half caliper on the wheel side suitable for facing the braking surface on the disc wheel side, at least one of the half calipers comprising a seat having a prevailing extension that defines an axial direction, the seat being suitable for seating a pushing element suitable for cooperating with a pad for exerting a braking action against the disc surfaces, the body comprising at least a bridge element suitable for structurally connecting the first and second half caliper, wherein the at least one bridge element defines a substantial longitudinal prevailing extension direction, the prevailing extension direction being inclined by a predetermined angle relative to the axial direction of the seat for seating the pushing element.

The seat can have a prevailing extension that defines an axial direction arranged substantially perpendicular to the braking surfaces on the support side and on the wheel side of the associable disc. The angle can be determined by the projections of the prevailing extension direction and of the axial direction relative to a projection plane perpendicular to the braking surfaces on the support side and on the wheel side of the brake disc. The angle can be between 1 and 60 degrees (e.g., between 20 and 40 degrees, or 30 degrees).

The caliper body can comprise a center line plane parallel to the axial direction and passing by the axis of rotation of the associable brake disc, the center line plane dividing the caliper body in an inlet portion and in an outlet portion, the inlet portion intercepting the brake disc during the forward motion of the vehicle first, a first connecting portion of the bridge element to the half caliper on the wheel side being positioned at the outlet portion.

The caliper body can comprise a center line plane parallel to the axial direction and passing by the axis of rotation of the associable brake disc, the center line plane dividing the caliper body in an inlet portion and in an outlet portion, the inlet portion intercepting the brake disc during the forward motion of the vehicle first, a first connecting portion of the bridge element to the half caliper on the wheel side being positioned at the inlet portion.

The caliper body can comprise a center line plane parallel to the axial direction and passing by the axis of rotation of the associable brake disc, the center line plane dividing the caliper body in an inlet portion and in an outlet portion, the inlet portion intercepting the brake disc during the forward motion of the vehicle first, a first connecting portion of the bridge element to the half caliper on the wheel side being positioned at least partly astride of the center line plane.

The caliper body can comprise a center line plane parallel to the axial direction and passing by the axis of rotation of the associable brake disc, the center line plane dividing the caliper body in an inlet portion and in an outlet portion, the inlet portion intercepting the brake disc during the forward motion of the vehicle first, a first connecting portion of the bridge element to the half caliper on the wheel side and a second connecting portion of the bridge element to the half caliper on the support side being positioned at opposite inlet and outlet portions of the caliper body.

The first connecting portion of the bridge element to the half caliper on the wheel side can be positioned on the outlet portion of the caliper body, and the second connecting portion of the bridge element to the half caliper on the support side can be positioned on the inlet portion of the caliper body, or the first connecting portion of the bridge element to the half caliper on the wheel side can be positioned on the inlet portion of the caliper body and the second connecting portion of the bridge element to the half caliper on the support side can be positioned on the outlet portion of the caliper body.

The disc brake caliper can comprise a first and a second end bridge, opposite to one another relative to the pads and respectively arranged at the inlet portion and at the outlet portion of the caliper body, the end bridges connecting the half calipers to one another and therewith delimiting a seating space for the pads, wherein the first connecting portion of the bridge element to the half caliper on the wheel side is positioned at the first end bridge. The second connecting portion of the bridge element to the half caliper on the support side can be positioned at the second end bridge. The second connecting portion of the bridge element to the half caliper on the support side can be positioned at the center line plane of the caliper body.

The disc brake caliper can comprise a first and a second end bridge, opposite to one another relative to the pads and respectively arranged at the inlet portion and at the outlet portion of the caliper body, the end bridges connecting the half calipers to one another and therewith delimiting a seating space for the pads, wherein the first connecting portion of the bridge element to the half caliper on the wheel side is positioned at the second end bridge. The second connecting portion of the bridge element to the half caliper on the support side can be positioned at the first end bridge. The second connecting portion of the bridge element to the half caliper on the support side can be positioned at the center line plane of the caliper body.

The disc brake caliper can comprise a first and a second inclined bridge element arranged at the inlet and outlet portion of the caliper body, respectively. The first and second inclined bridge elements can be substantially extended according to directions parallel to one another.

The caliper body can comprise a central bridge substantially axially directed that structurally connects the first and second half caliper.

The at least one inclined bridge element can be in a single block with the first and second half caliper.

The bridge element can be associated to the first and second half caliper of the caliper body by first threaded connecting means according to an upwind element configuration.

The bridge element can comprise a duct passing inside the bridge and suitable for making a fluid connection between the first and second half caliper for the passage of a cooling flow in the caliper body.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
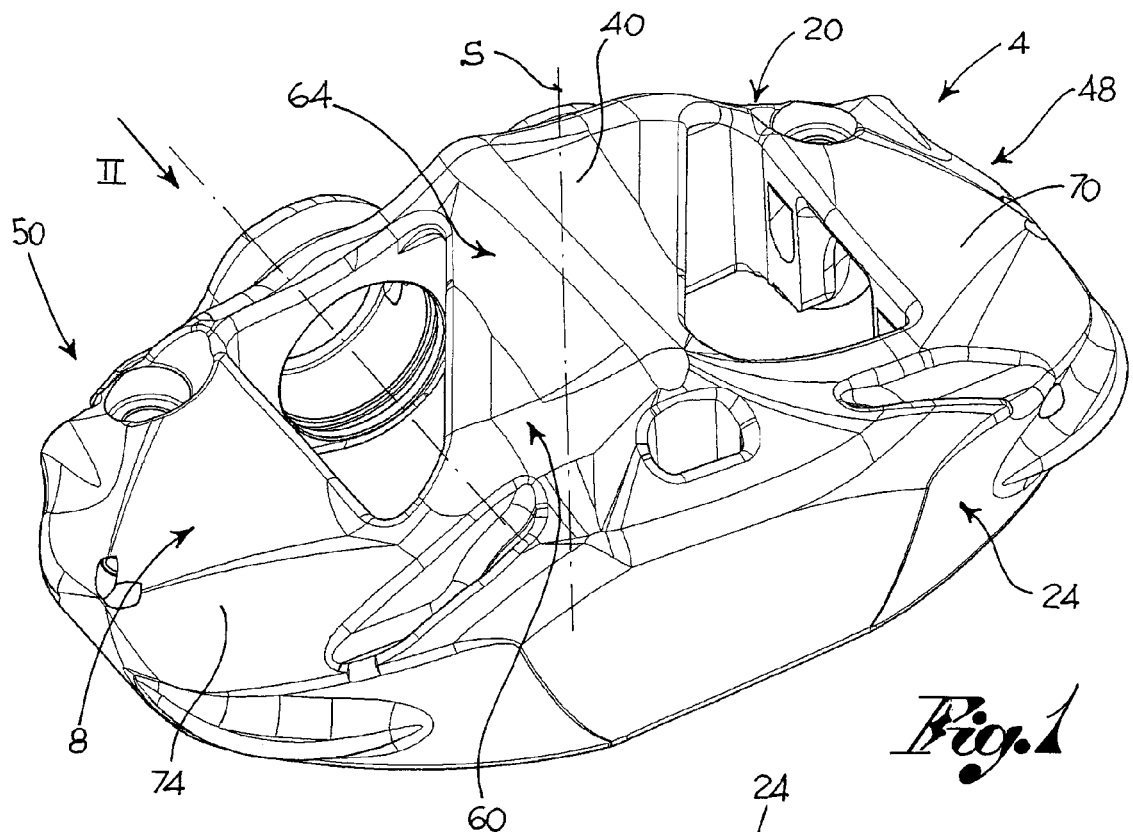
FIG. 1 shows a perspective view of a caliper as provided herein.
Figure 2:
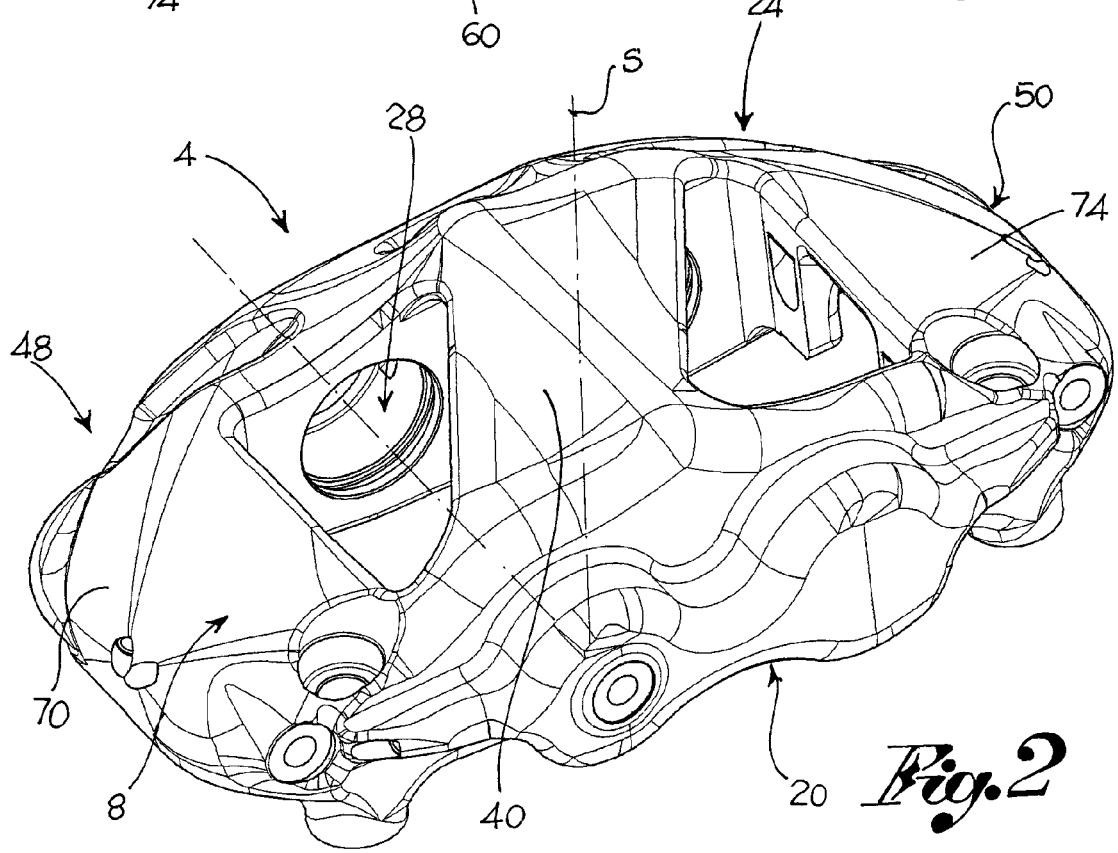
FIG. 2 shows a perspective view of the caliper of FIG. 1, from the side of arrow II of FIG. 1.

Elements or parts of elements in common between the embodiments described below are referred to with the same reference numerals. By "axial direction" is meant a direction parallel to the axis of rotation of the brake disc and of the relevant wheel. By "radial direction" is meant a direction perpendicular to the axial direction and passing by the axis of rotation of the brake disc. By "tangential direction" is meant a direction perpendicular to the axial direction and to the radial direction.

By "directions inclined relative to each other" by an angle is meant that the angle formed between two directions defined by any two straight lines or half-lines that represent the average profile of a body having for example a longitudinal extension. The angle is evaluated, for example by projecting the two directions on a selected plane. For example, it is possible to use as a reference plane a plane containing an axis arranged along the axial direction, the plane being arranged perpendicular to the disc braking surfaces.

With reference to FIGS. 1-9, reference numeral 4 generically indicates a disc brake caliper. The disc brake caliper 4 comprises a caliper body 8 suitable for being fixed to a fixed structure, that is, not rotating of a motor vehicle and suitable for being arranged astride of a disc for disc brake.

The disc can have a braking surface on the support side and a braking surface on the wheel side, respectively facing the associable support, for fixing the caliper to the vehicle, and to the associable wheel, integrally constrained in rotation to the disc.

The caliper body 8 can have a first half caliper 20 on the support side suitable for facing the braking surface on the disc support side and a second half caliper 24 on the wheel side suitable for facing the braking surface on the disc wheel side.

At least one of the half calipers 20, 24 can comprise a seat 28 having a prevailing extension that defines an axial direction X-X arranged substantially perpendicular to the surfaces on the support side and on the wheel side of the associable disc. The seat 28 can be suitable for seating a pushing element suitable for cooperating with a pad for exerting a braking action against the disc surfaces.

The caliper body 8 can comprise at least one bridge element 40 suitable for structurally connecting the first and second half caliper 20, 24. In other words, the bridge element 40 can mechanically connect the two half calipers to one another so as to oppose resistance to the deformations of the caliper body induced, for example, by the braking forces exchanged with the brake disc.

Figure 3:
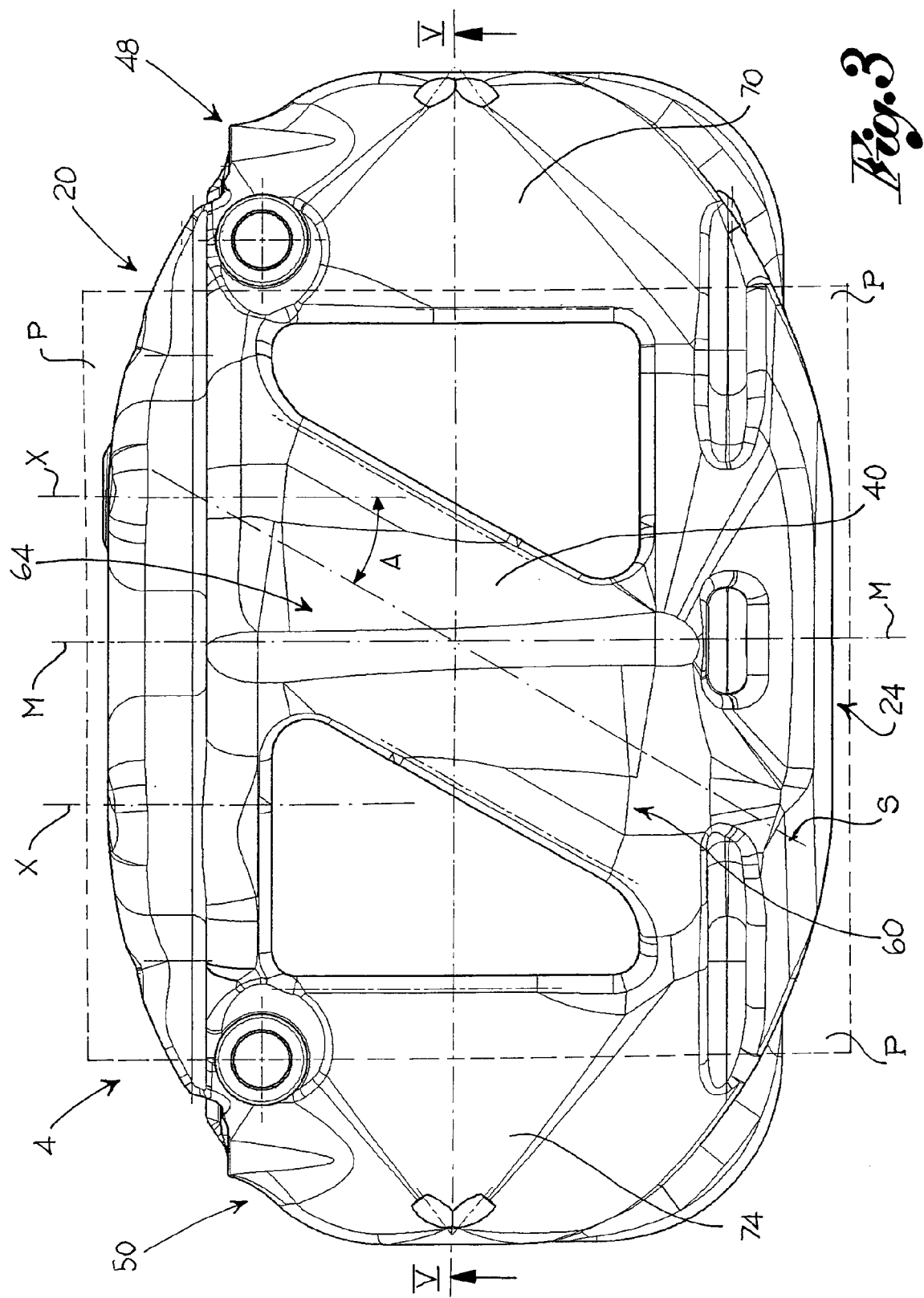
FIG. 3 shows a plan top view of the caliper of FIG. 1.
Figure 4:
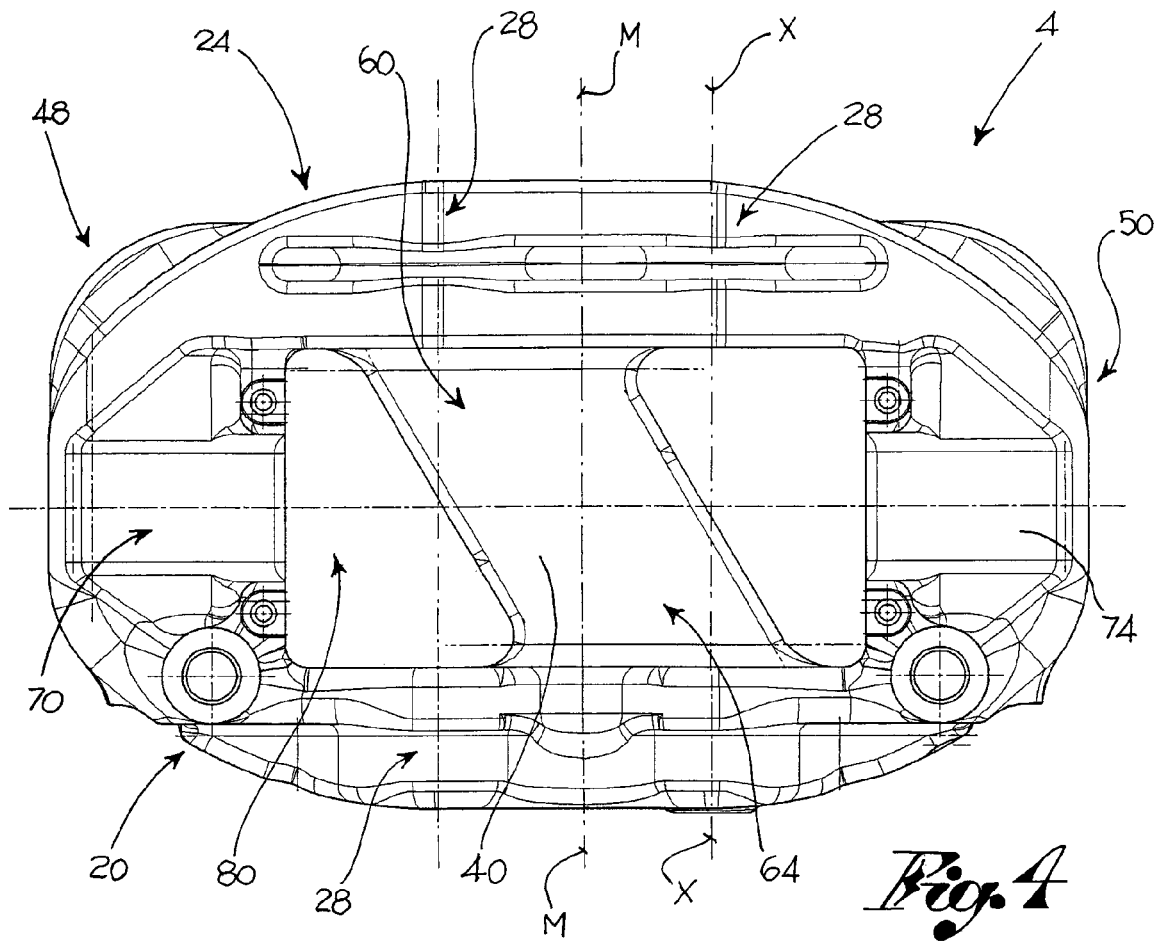
FIG. 4 shows a plan bottom view of the caliper of FIG. 1.
Figure 5:
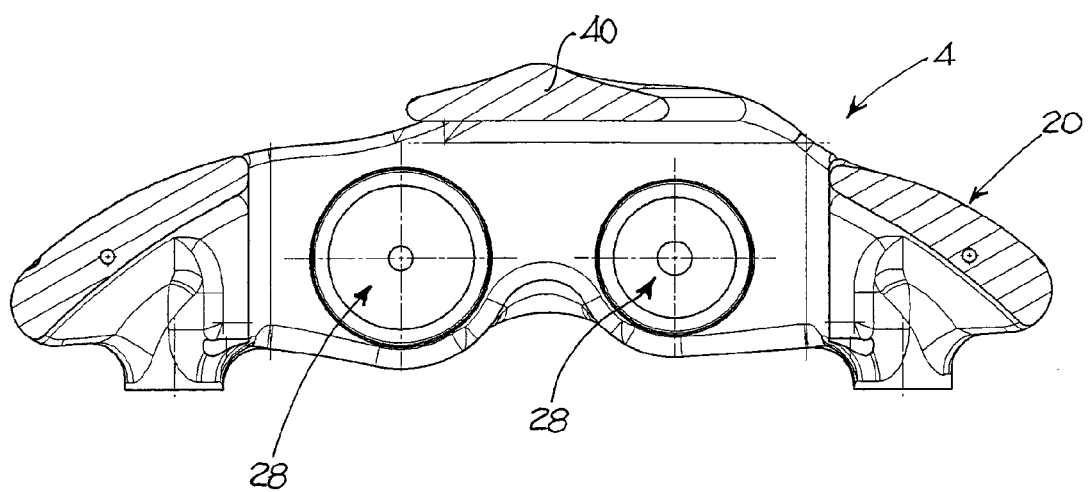
FIG. 5 shows a section view of the caliper of FIG. 1, along the section line V-V of FIG. 4.
Figure 6:
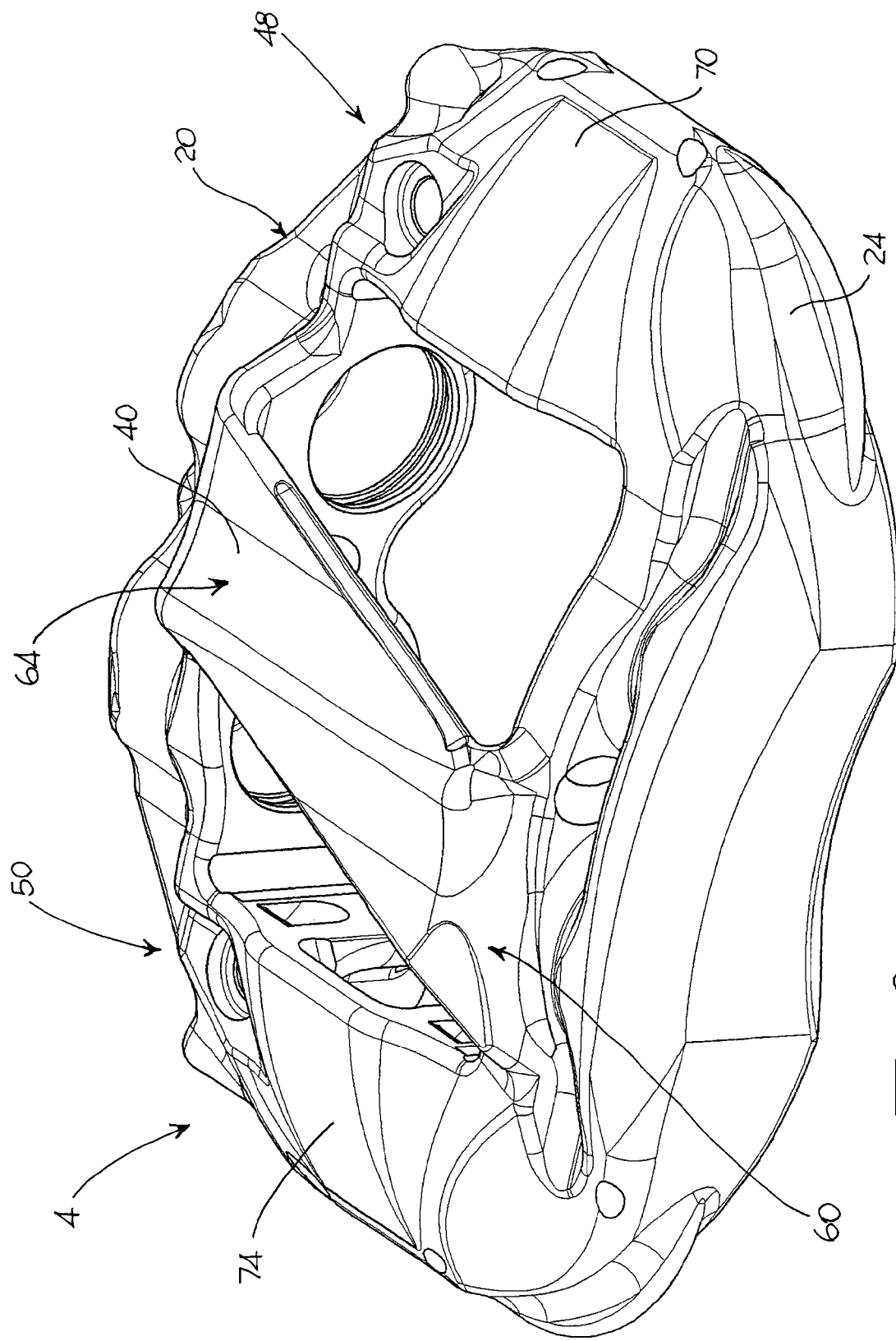
FIG. 6 shows a perspective view of a caliper as provided herein.

Advantageously, the at least one bridge element 40 can exhibit a longitudinal prevailing extension and directed along an axis S-S, the prevailing extension axis S-S being inclined by an angle A relative to the axial direction X-X of seat 28 for seating the pushing element. The angle A can be found by projecting the prevailing extension axis S-S and the axial direction relative to a same projection plane V, for example, selected perpendicular to the braking surfaces on the support side and on the wheel side of the brake disc and also comprising the prevailing extension axis of the caliper (FIG. 3). Angle A can be, for example, between 1 and 60 degrees (e.g., between 20 and 40 degrees, or 30 degrees).

In some embodiments, the caliper body 8 can have a center line plane M-M parallel to the axial direction X-X and passing by the axis of rotation of the associable brake disc, the plane dividing the caliper body in an inlet portion 48 and in an outlet portion 60. The inlet portion 48, during the forward motion of the vehicle, can intercept an inlet portion of the brake disc first, as compared to the outlet portion 50.

The bridge element 40 can extend from a first connecting portion 60 to the second half caliper 24 on the wheel side to a second connecting portion 64 to the first half caliper 20 on the support side. The first connecting portion 60 of the bridge element 40 to the second half caliper 24 on the wheel side can be positioned, for example, at the outlet portion 50 of the caliper body 8, at the inlet portion 48 of the caliper body, or at least partly astride of the center line plane M-M.

In some embodiments, the first connecting portion 60 of the bridge element 40 to the second half caliper 24 on the wheel side and the second connecting portion 64 of the bridge element 40 to the first half caliper 20 on the support side can be positioned at opposite inlet 48 and outlet 50 portions of the caliper body 8. For example, the first connecting portion 60 of the bridge element 40 can be positioned on the outlet portion 50 of the caliper and the second connecting portion 64 of the bridge element 40 can be positioned on the inlet portion 48 of the caliper 4, or the first connecting portion 60 can be positioned on the inlet portion 48 of the caliper 4 and the second connecting portion 64 can be positioned on the outlet portion 50 of caliper 4.

The caliper 4 can comprise a first end bridge 70 and a second end bridge 74, which can be opposite to one another relative to the pads and respectively arranged at the inlet portion 48 and the outlet portion 50 of the caliper body 8. The end bridges 70, 74 can connect the half calipers 20, 24 to one another, delimiting a seating space 80 for the pads (see, e.g., FIGS. 4, 7A, and 7B).

In some embodiments, the first connecting portion 60 of the bridge element 40 can be positioned at the first end bridge 70. In other embodiments, the first connecting portion 60 of the bridge element 40 can be positioned at the center line plane M-M of the caliper body 8.

The caliper can comprise a first bridge element 90 and a second bridge element 100, which can be inclined relative to the axial direction and can be arranged at the inlet portion 48 and the outlet portion 50, respectively, of the caliper body 8. The caliper 4 can comprise the first and second end bridge 70, 74, opposite to one another relative to the pads, and respectively arranged at the inlet portion 48 and at the outlet portion 50 of the caliper body 8. The end bridges 70, 74 can connect the half calipers 20, 24 to one another, delimiting the seating space 80 for the pads.

Figure 7A:
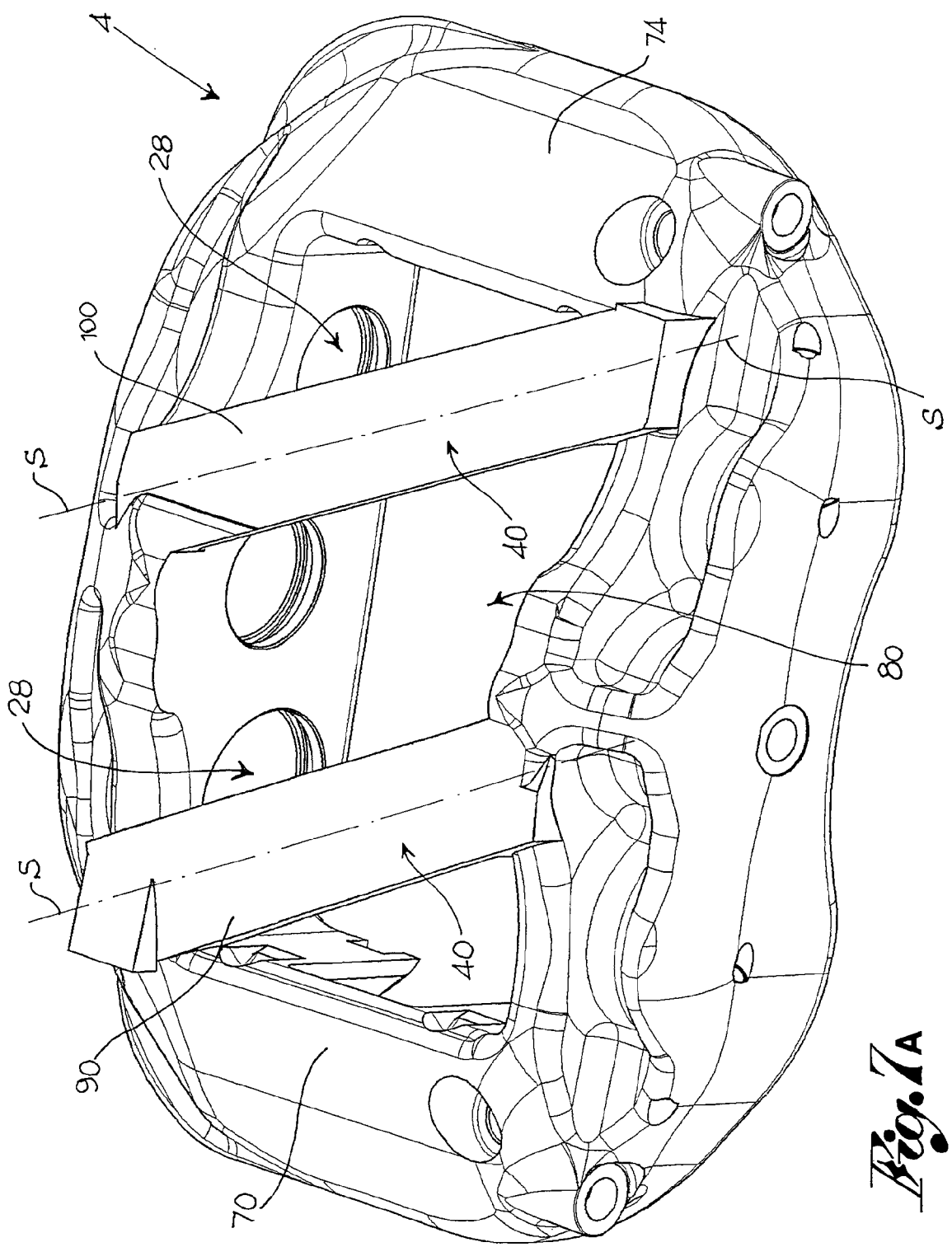
FIGS. 7A and 7B show perspective views of calipers as provided herein.
Figure 7B:
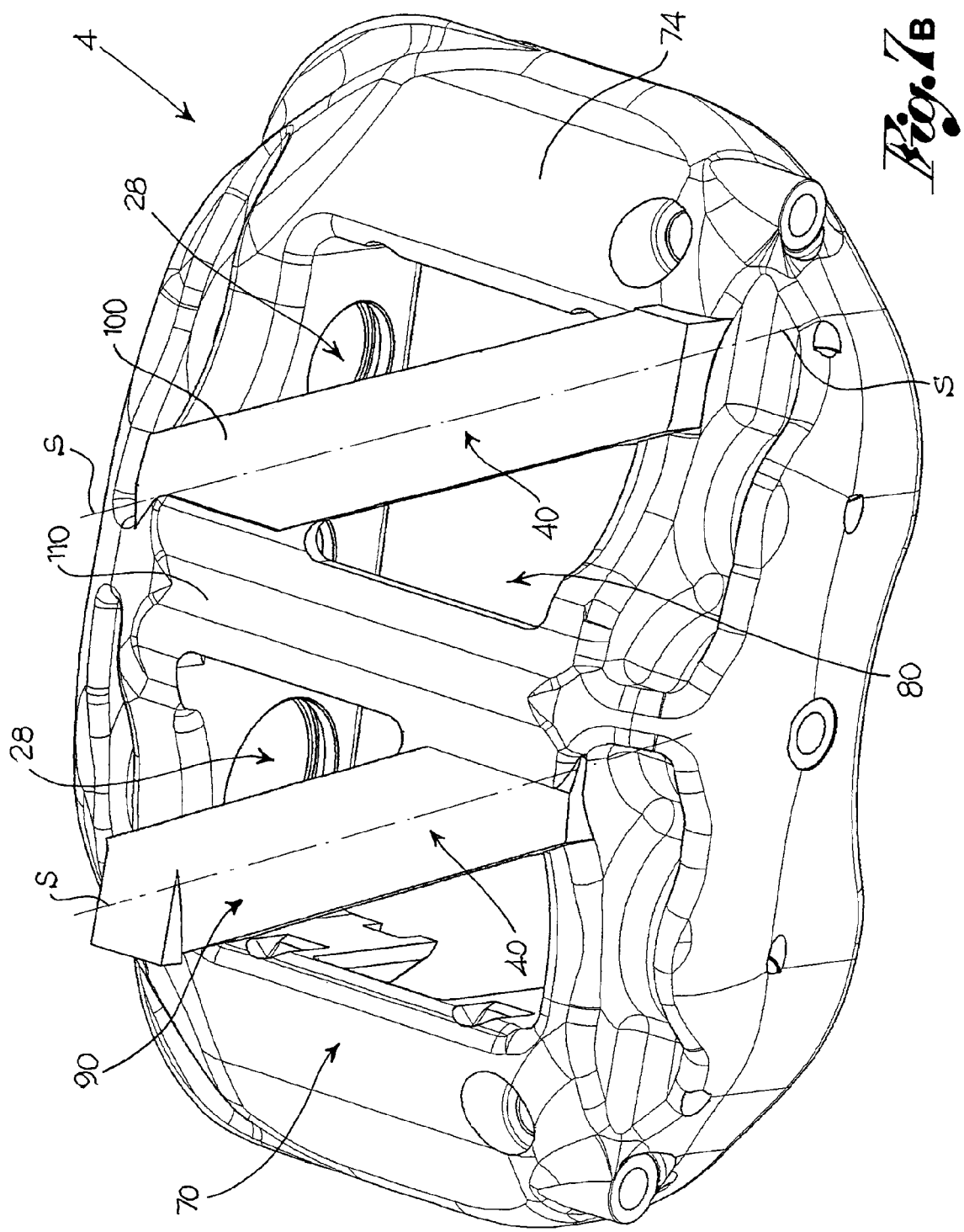

In some embodiments (e.g., as depicted in FIG. 7A), the first and second bridge elements 90, 100 can be substantially extended according to directions parallel to one another. As depicted in FIG. 7B, the caliper 4 can comprise the first and second end bridge 70, 74, opposite to one another relative to the pads and respectively arranged at the inlet portion 48 and at the outlet portion 50 of the caliper body 8. The end bridges 70, 74 can connect the half calipers 20, 24 to one another, delimiting the seating space 80 for the pads. A central bridge 110 substantially axially directed and suitable for structurally connecting the first and second half caliper 20, 24, can be side by side with the first and second bridge element 90, 100.

Figure 8:
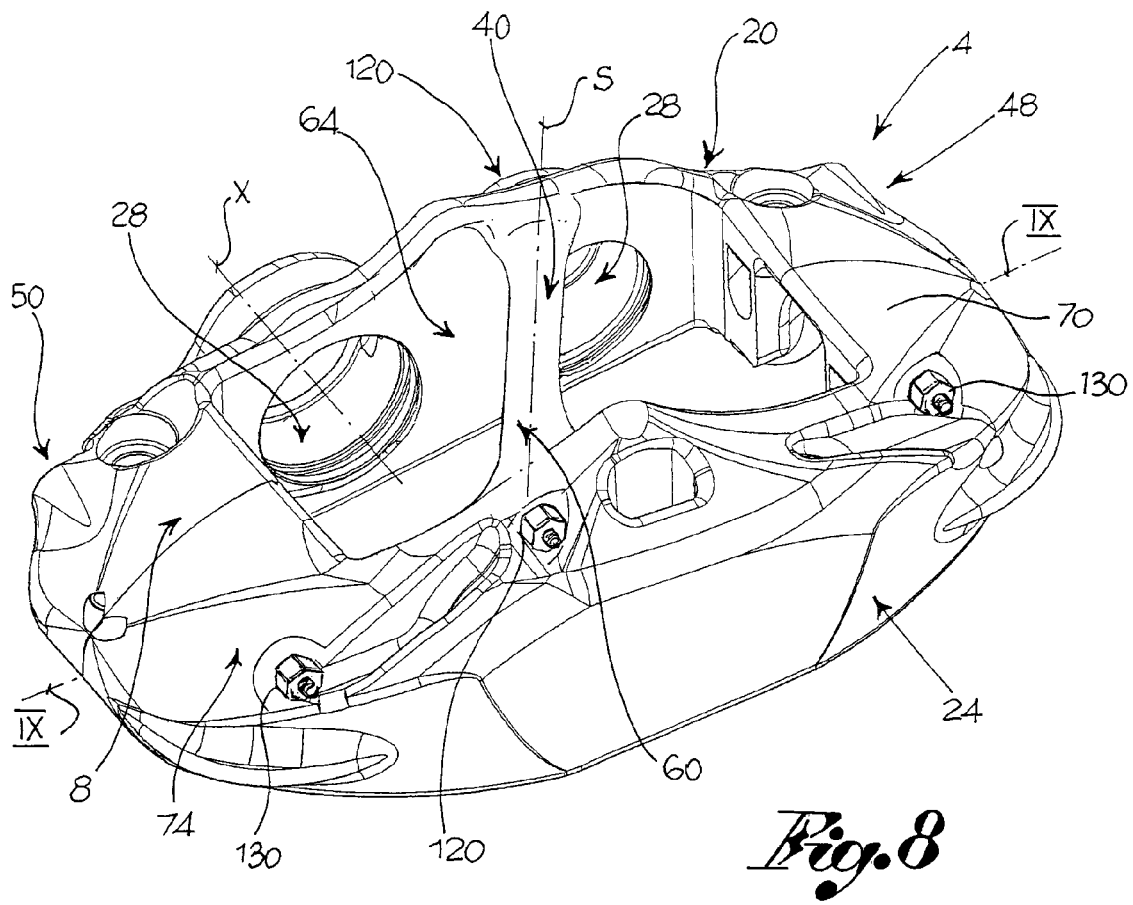
FIG. 8 shows a perspective view of a caliper as provided herein.
Figure 9:
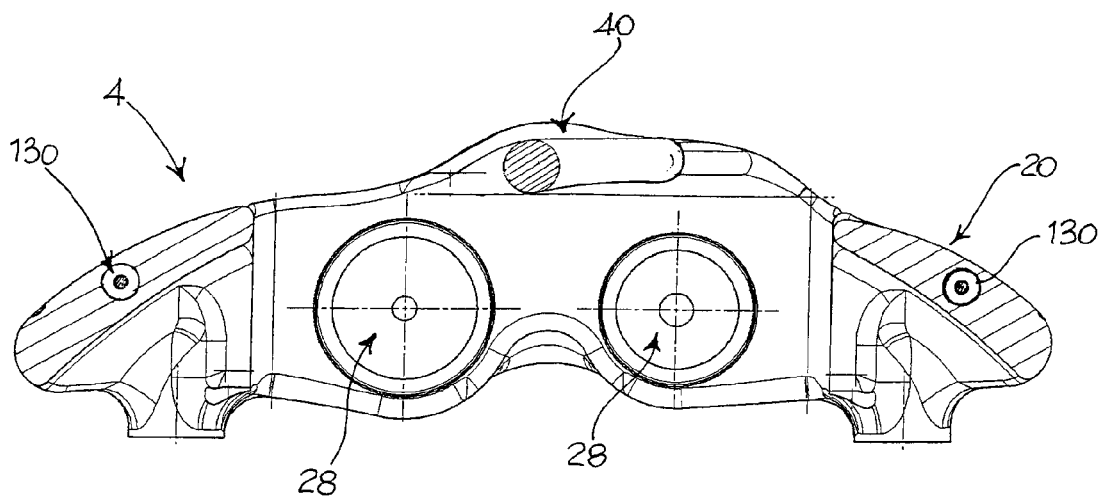
FIG. 9 shows a section view of the caliper of FIG. 8, relative to the section plane IX-IX of FIG. 8.

In some embodiments, the bridge element 40 can be integral with the first and second half caliper 20, 24 of the caliper body 8. In other embodiments, the bridge element 40 can be distinct from the caliper body 8, and can be associated to the first and second half caliper 20, 24 by first threaded connecting means 120, according to an upwind element configuration 10 (FIGS. 8-9).

In some cases, the bridge element 40 can have a duct that passes inside the bridge and is suitable for making a fluid connection between the first and second half caliper of the caliper body, e.g., for the passage of a cooling flow in the caliper body 8.

The caliper 4 can be either fixed or floating. The caliper can be in a single block or can be of the type in two half calipers separate and associated to one another by second threaded connecting means 130.

Those of skill in the art will appreciate that a disc brake caliper as described herein can overcome disadvantages exhibited by other calipers. Unusually, for example, the caliper can have a bridge element arranged according to a prevailing extension direction that is inclined relative to the axial direction. Such a caliper can be especially resistant to the tangential forces transmitted by the pads, and in particular to the forces transmitted by the pads of the half caliper on the wheel side that have a considerable arm compared to the caliper supports.

The caliper can be deformed in a limited and controlled manner, maintaining the geometry of the piston seats and thus ensuring the correct return of the pistons at the end of the pressure exerted by the braking fluid. The pad wear and the brake can be even, particularly in heavy usage conditions. The central body can exhibit a limited mass while ensuring high stiffness of the caliper body. The central bridge can ensure a wide window to the pad seating space, allowing a high disposal of heat from the caliper body outwards.

During the braking action a part of the tangential force that causes the "twisting" can be relieved on the central body as a tensile or compressive stress, whereas in other bridges such tangential force is relieved as shearing stress. Therefore, a caliper as described herein can provide greater stiffness and resistance to "twisting" deformations as compared to other calipers, while ensuring high resistance to axial deformations.

In some embodiments, one central bridge can be connected to the half caliper on the wheel side at the piston having the largest section, that is, the piston arranged at the inlet portion of the caliper body. Since such a piston usually has a larger diameter than the others, the pressure exerted by the brake fluid being equal, it tends to open the caliper body more in the axial direction.

The inclined bridge element can be a support to the pads in the radial direction, according to a direction of separation from the associable brake disc. By "inclined bridge" is meant a bridge having a longitudinal direction not parallel to the axial direction. The provision of two inclined bridge elements can allow for radial locking of the pads outwards. In other words, the two bridge elements, arranged in the respective inlet and outlet portions of the caliper body, can allow for radially constraining the pads using retaining springs, for example. This can be especially advantageous in the case of calipers provided with four pads.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A disc brake caliper, comprising
a caliper body suitable for being fixed to a fixed support structure of a motor vehicle and suitable for being arranged astride of a disc for a disc brake,
said disc comprising a braking surface on the support side and a braking surface on the wheel side, opposite said braking surface on the support side and facing an associated wheel of the vehicle,
said caliper body comprising a first half caliper on the support side suitable for facing said braking surface on the disc support side and a second half caliper on the wheel side suitable for facing said braking surface on the disc wheel side,
at least one of said half calipers comprising a seat having a prevailing extension that defines an axial direction, said seat being suitable for seating a pushing element suitable for cooperating with a pad for exerting a braking action against said disc surfaces,
the body comprising a bridge element suitable for structurally connecting said first and second half caliper,
wherein said bridge element defines a substantially longitudinal prevailing extension direction, said prevailing extension direction being inclined by a predetermined angle relative to said axial direction of the seat for seating the pushing element, said angle being determined by projecting the prevailing extension direction and the axial direction onto a projection plane perpendicular to said braking surfaces on both sides of the brake disc.

2. The disc brake caliper according to claim 1, comprising a first and a second end bridge, opposite to one another relative to said pads and respectively arranged at said inlet portion and at said outlet portion of the caliper body, said end bridges connecting the half calipers to one another and therewith delimiting a seating space for the pads, wherein the first connecting portion of the bridge element to the half caliper on the wheel side is positioned at the first end bridge.

3. The disc brake caliper according to claim 2, comprising a first and a second inclined bridge element arranged at said inlet and outlet portion of the caliper body, respectively.

4. The disc brake caliper according to claim 3, wherein said first and second inclined bridge elements are substantially extended according to directions parallel to one another.

5. The disc brake caliper according to claim 2, wherein the second connecting portion of the bridge element to the half caliper on the support side is positioned at the second end bridge.

6. The disc brake caliper according to claim 2, wherein the second connecting portion of the bridge element to the half caliper on the support side is positioned at said center line plane of the caliper body.

7. The disc brake caliper according to claim 1, wherein the caliper body comprises a center line plane parallel to said axial direction and passing by the axis of rotation of the brake disc, said center line plane dividing the caliper body in an inlet portion and in an outlet portion, the inlet portion intercepting the brake disc during the forward motion of the vehicle first, a first connecting portion of the bridge element to the half caliper on the wheel side and a second connecting portion of the bridge element to the half caliper on the support side being positioned at opposite inlet and outlet portions of the caliper body.

8. The disc brake caliper according to claim 7, wherein said first connecting portion of the bridge element to the half caliper on the wheel side is positioned on the outlet portion of the caliper body and said second connecting portion of the bridge element to the half caliper on the support side is positioned on the inlet portion of the caliper body.

9. The disc brake caliper according to claim 7, wherein said first connecting portion of the bridge element to the half caliper on the wheel side is positioned on the inlet portion of the caliper body and said second connecting portion of the bridge element to the half caliper on the support side is positioned on the outlet portion of the caliper body.

10. The disc brake caliper according to claim 1, comprising a first and a second end bridge, opposite to one another relative to said pads and respectively arranged at said inlet portion and at said outlet portion of the caliper body, said end bridges connecting the half calipers to one another and therewith delimiting a seating space for the pads, wherein the first connecting portion of the bridge element to the half caliper on the wheel side is positioned at the second end bridge.

11. The disc brake caliper according to claim 10, wherein the second connecting portion of the bridge element to the half caliper on the support side is positioned at the first end bridge.

12. The disc brake caliper according to claim 10, wherein the second connecting portion of the bridge element to the half caliper on the support side is positioned at said center line plane of the caliper body.

13. The disc brake caliper according to claim 1, wherein the prevailing direction of the seat extends substantially perpendicular to the braking surfaces on the support side and on the wheel side of the disc.

14. The disc brake caliper according to claim 1, wherein said angle is between 1 and 60 degrees.

15. The disc brake caliper according to claim 1, wherein said angle is between 20 and 40 degrees.

16. The disc brake caliper according to claim 1, wherein said angle is 30 degrees.

17. The disc brake caliper according to claim 1, wherein the caliper body comprises a center line plane parallel to said axial direction and passing by the axis of rotation of the brake disc, said center line plane dividing the caliper body in an inlet portion and in an outlet portion, the inlet portion intercepting the brake disc during the forward motion of the vehicle first, a first connecting portion of the bridge element to the half caliper on the wheel side being positioned at said outlet portion.

18. The disc brake caliper according to claim 1, wherein the caliper body comprises a center line plane parallel to said axial direction and passing by the axis of rotation of the brake disc, said center line plane dividing the caliper body in an inlet portion and in an outlet portion, the inlet portion intercepting the brake disc during the forward motion of the vehicle first, a first connecting portion of the bridge element to the half caliper on the wheel side being positioned at said inlet portion.

19. The disc brake caliper according to claim 1, wherein the caliper body comprises a center line plane parallel to said axial direction and passing by the axis of rotation of the brake disc, said center line plane dividing the caliper body in an inlet portion and in an outlet portion, the inlet portion intercepting the brake disc during the forward motion of the vehicle first, a first connecting portion of the bridge element to the half caliper on the wheel side being positioned at least partly astride of said center line plane.

20. The disc brake caliper according to claim 1, wherein said caliper body comprises a central bridge substantially axially directed that structurally connects said first and second half caliper.

21. The disc brake caliper according to claim 1, wherein said at least one inclined bridge element is in a single block with said first and second half caliper.

22. The disc brake caliper according to claim 1, wherein said bridge element is associated to said first and second half caliper of the caliper body by first threaded connecting means according to an upwind element configuration.

23. The disc brake caliper according to claim 1, wherein said bridge element comprises a duct passing inside the bridge and suitable for making a fluid connection between said first and second half caliper for the passage of a cooling flow in the caliper body.

* * * * *